United States Patent [19]
McAskill

[11] Patent Number: 5,249,475
[45] Date of Patent: Oct. 5, 1993

[54] EIGHT- TO SIXTEEN-SPEED POWERSHIFT TRANSMISSION

[75] Inventor: John P. McAskill, Coffeyville, Kans.

[73] Assignee: Deere & Company, Moline, Ill.

[21] Appl. No.: 938,926

[22] Filed: Aug. 31, 1992

[51] Int. Cl.$^5$ ............................................. F16H 3/08
[52] U.S. Cl. ................................... 74/331; 74/360
[58] Field of Search ............................ 74/331, 360

[56] References Cited

U.S. PATENT DOCUMENTS

| | | | |
|---|---|---|---|
| 4,245,519 | 1/1981 | Herlitzek | 74/331 |
| 4,392,391 | 7/1983 | Jameson et al. | 74/331 X |
| 4,549,443 | 10/1985 | White | 74/331 X |
| 4,589,294 | 5/1986 | Keenan et al. | 74/331 |
| 4,846,609 | 7/1989 | Paluska, Jr. | 74/331 |
| 4,864,881 | 9/1989 | Beeson et al. | 74/331 X |
| 5,063,793 | 11/1991 | McAskill | 74/360 |

Primary Examiner—Dirk Wright

[57] ABSTRACT

A transmission configuration is provided which can be easily modified to provide a 12 forward, 4 reverse speed transmission, an 8 forward, 8 reverse speed transmission, an 8 forward, 4 reverse speed transmission, or a 4 forward, 4 reverse speed transmission by replacement of a few components. The overwhelming majority of the components in the transmission stay the same in any of the configurations, including most of the shafts, clutches, gears, and the housing.

10 Claims, 6 Drawing Sheets

EIGHT- TO SIXTEEN-SPEED POWERSHIFT TRANSMISSION

BACKGROUND OF THE INVENTION

1. Field of the Invention

The present invention relates to powershift transmissions for vehicles, e.g., work vehicles such as tractors and industrial equipment, and in particular, to transmissions of the type which can be altered easily to provide a variety of transmission ratios.

2. Description of the Related Art

Vehicles of various sizes require variously-sized transmissions Even vehicles of comparable sizes may need different gear ratios available to them, depending upon the working environment in which the vehicle will operate. For example, an agricultural tractor needs a large number of gears providing ground speeds between 2 and 5 kilometers per hour. In contrast, construction equipment typically does not need as many gear ratios in this range. However, the two pieces of equipment may otherwise be very similar. Indeed, early farm and construction equipment often was virtually identical.

As a result of these varying needs, it is not unusual to provide a variety of transmission options. Different transmissions provide different numbers or combinations of gear ratios, different transmission housings, and the like. Unfortunately, the larger the number of options, the greater the cost.

SUMMARY OF THE INVENTION

It is the object of the present invention to provide a transmission design which has the flexibility to provide a variety of different combinations of forward and reverse speeds with minimal component changes between the configurations.

It is a further object of the invention to use as many common parts throughout the transmission as possible, so that the variety of configurations can be produced at minimal cost.

According to the present invention, these objects are achieved by providing a transmission having a high number of identical parts on up to seven shafts. The first shaft is the input shaft, which has two or three gears fixed to it. The second, third, fourth and fifth shafts are clutch shafts which have double-acting clutches fixed to them, and which are identical in construction. Each of these shafts then has different gears rotatably mounted on each side of the two clutches. The sixth shaft has a number of gears fixed to it, and the seventh shaft is the output shaft.

The shafts are arranged such that the main power path is through shafts one, two, four, six and seven. Shaft three is located so that it forms a triangle with shafts one and two. Shaft five is located adjacent to shaft four.

This arrangement allows the transmission to be configured with 12 forward and 4 reverse speeds, 8 forward and 8 reverse speeds, or 8 forward and 4 reverse speeds with only a few minor part changes. A configuration with 4 forward and 4 reverse speeds also can be obtained by omitting shaft five from the 8 forward and 8 reverse speed configuration. In all cases, the housing can remain identical, and the total number of parts is kept to a bare minimum.

DETAILED DESCRIPTION OF THE PREFERRED EMBODIMENTS

Figure 1:
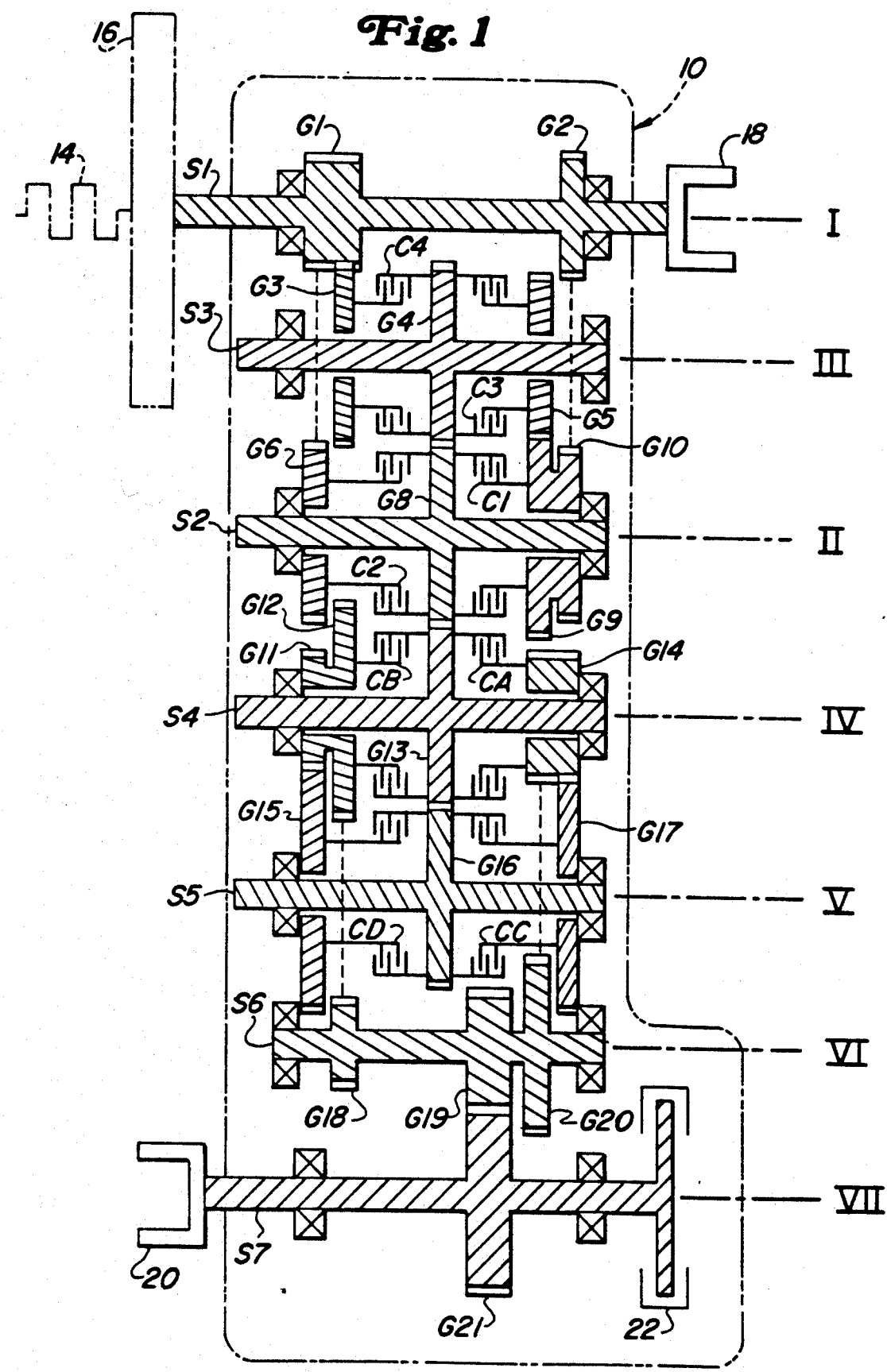
FIG. 1 is view of a 12 forward, 4 reverse speed of the transmission.
Figure 2:
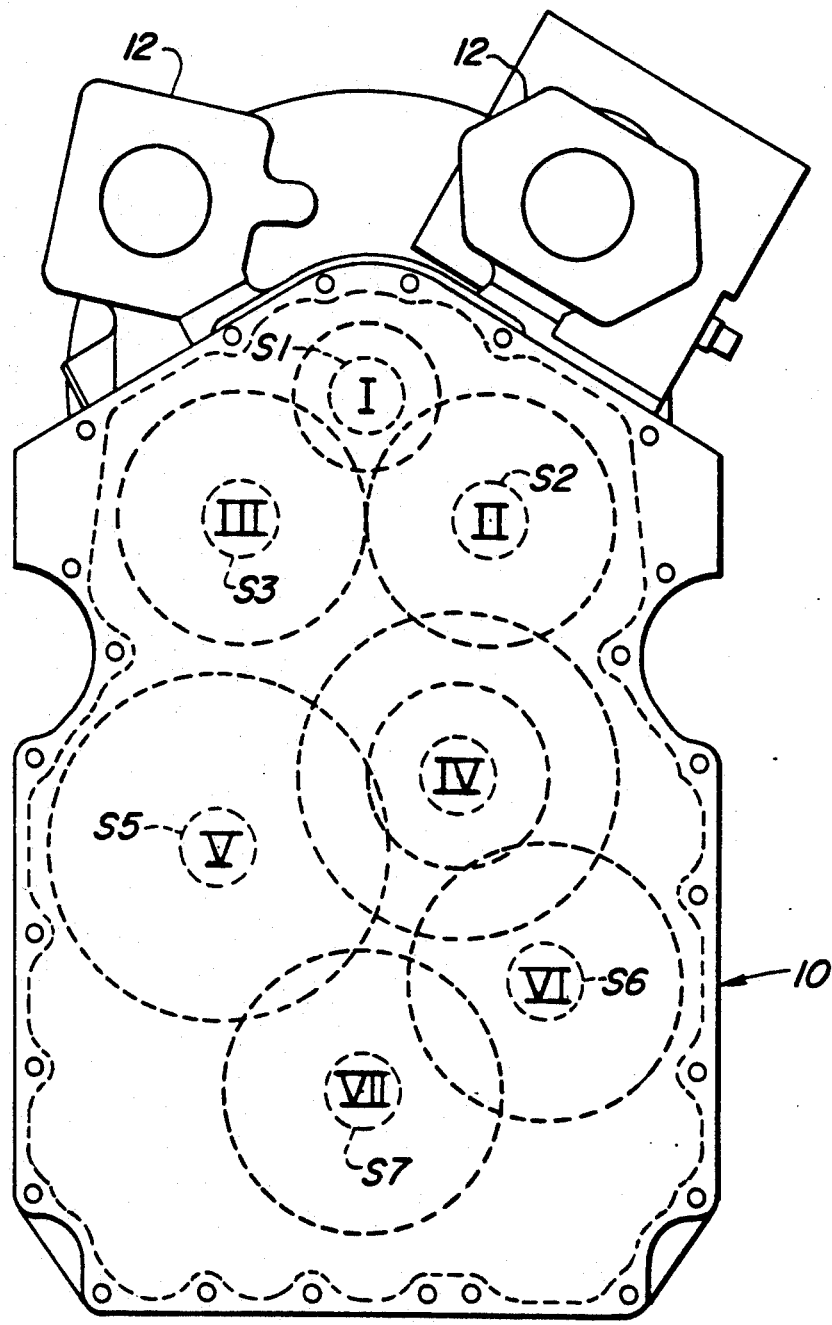
FIG. 2 shows the relative position of the shafts in FIG. 1.

FIG. 1 schematically illustrates a 12-forward, 4-reverse speed transmission. A transmission housing 10 has 7 shafts S1, S2, S3, S4, S5, S6, S7, rotatably mounted therein. The shafts are positioned schematically in FIG. 1 to aid in description. The center axis of each shaft is indicated with the corresponding Roman numeral on the right side of the figure, and the actual positions of the shafts relative to one another is best seen in FIG. 2, which shows an end view of the transmission housing 10. As shown in FIG. 2, the transmission housing 10 preferably is provided with mounting locations for suitable additional elements 12, e.g., pumps and the like.

Returning to FIG. 1, first shaft S1 has gears G1, G2 fixed for rotation therewith. The gears may be formed either integrally with the first shaft S1 or separately and then fixed to the shaft S1. As viewed in the figure, the left-hand end of shaft S1 receives input power from a power supply 14, e.g., an engine, via a torque convertor or main clutch 16. The right end of first shaft S1 is provided with a PTO yoke 18 to provide power to a suitable power-take-off shaft (not shown).

Second and third shafts, S2, S3, are positioned adjacent to first shaft S1 (see FIG. 2). Gear G4 is positioned near the center of and fixed for rotation with shaft S3, and gear G8 is positioned near the center and fixed for rotation with shaft S2. Gears G4, G8 mesh with each other. Gears G3, G5 are rotatably mounted about shaft S3. Single gear G6 and double gear G9, G10 are rotatably mounted about shaft S2. Clutches C3 and C4 are provided about shaft S3 for selectively fixing gears G5 and G3, respectively, for rotation with shaft S3. Clutches C1, C2 are provided about shaft S2 for selectively fixing gears G9, G10 and G6, respectively, for rotation with shaft S2. Gear G1 meshes continuously with gears G1, G6. Gear G2 meshes continuously with gear G10, and gear G9 meshes continuously with gear G5.

The fourth shaft S4 is positioned slightly below second shaft S2. Gear G13 is positioned near the center of and fixed for rotation with fourth shaft S4. Double gear G11, G12 and single gear G14 are rotatably mounted about shaft S4. Clutches CA and CB are provided about shaft S4 for selectively fixing gears G14 and G11, G12, respectively, for rotation with shaft S4. Gear G13 meshes continuously with gear G8.

Fifth shaft S5 is positioned adjacent to and slightly below shaft S4. Gear G16 is positioned near the center of and fixed for rotation with shaft S5. Gears G15, G17 are rotatably mounted about shaft S5. Clutches CC, CD are provided about shaft S5 to fix gears G17, G15, respectively, for rotation therewith. Gear G15 meshes continuously with gear G11, while gear G17 meshes continuously with gear G14.

Sixth shaft S6 is mounted below shaft S4, and is provided with gears G18, G19, G20 fixed for rotation therewith. Gear G18 meshes continuously with gear 12, and gear G20 meshes continuously with gear G14.

Seventh shaft S7 serves as the output shaft, and is provided with a gear 21 fixed for rotation therewith. Gear 21 meshes continuously with gear G19. The left end of shaft S7 is provided with a rear wheel drive yoke 20 to provide output power to a suitable drive shaft for the rear wheels of the vehicle in which the transmission is mounted. A parking brake 22 is provided at the right end of output shaft S7.

Figure 3:
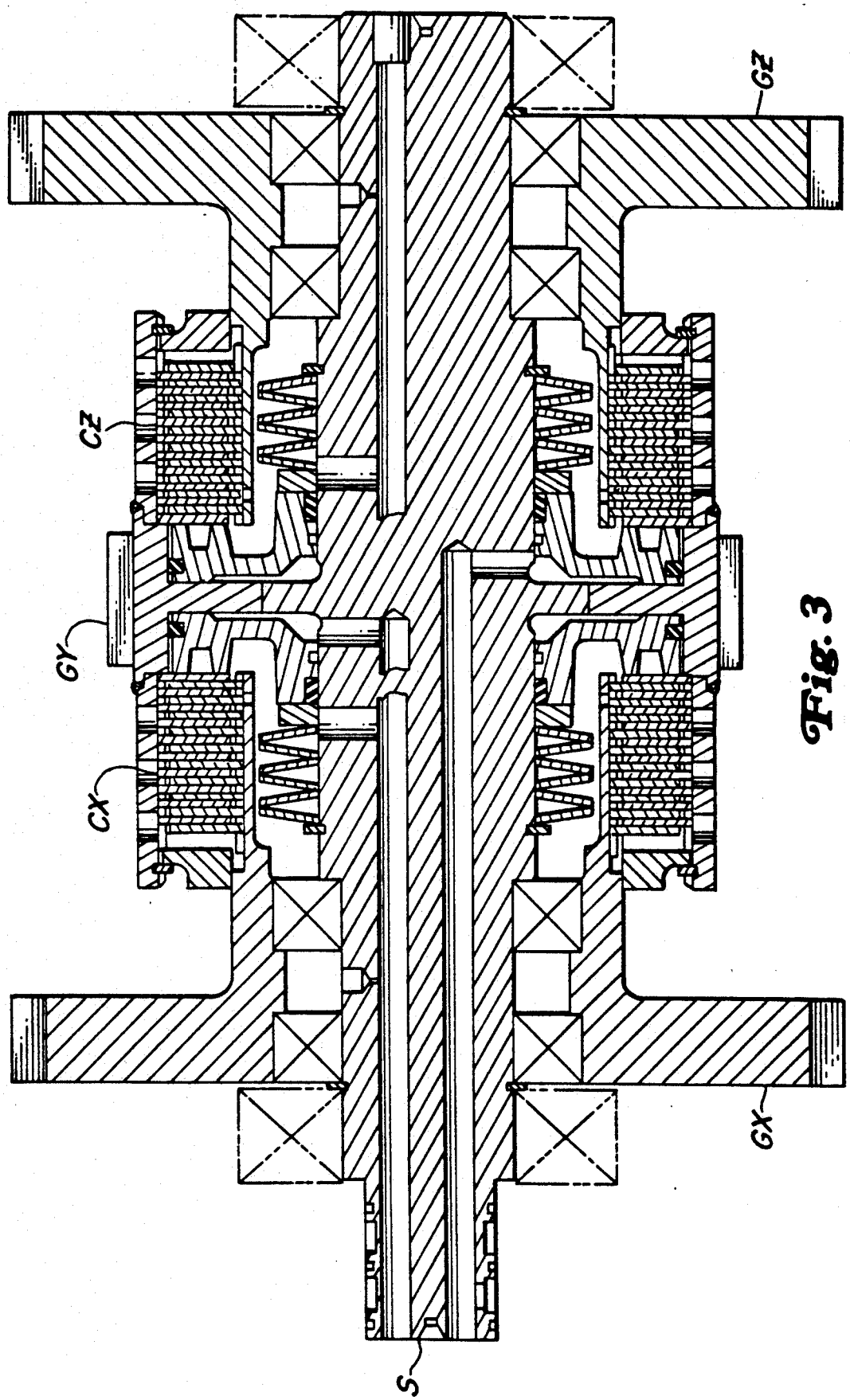
FIG. 3 is a detailed view of one of the shaft, clutch, and gear combinations of the transmission shown in FIG. 1.

Review of the schematic will show the shafts S2, S3, S4, S5 are all identical. A suitable shaft with sample gears is shown in FIG. 3. The shaft S has a central gear GY either formed as part of the milling operation to form the shaft, or fixed to the shaft S. Clutches CX, CZ are provided on either side of gear GY. Gears GX, GZ then are rotatably mounted by suitable bearings about the shaft S. As shown in the drawing, suitable bores preferably are provided in the shaft S to provide working and/or cooling fluid to the clutches CX, CZ.

As will be apparent, the gear ratios to be provided in the transmission can be altered easily simply by substituting different gears or combinations of single or double gears for the gears GX, GZ shown in FIG. 3. This is what has been done to provide the varying configurations for the shafts S2, S3, S4, S5. However, the overwhelming majority of the parts involved in the transmission are identical from one shaft to the next—only the gears change.

Returning to the specific embodiment shown in FIG. 1, the transmission can be operated by engaging the various clutches as indicated in Table 12/4 to provide the various transmission ratios.

TABLE 12/4

| Gear | Clutch | | | | | | | |
|------|---|---|---|---|---|---|---|---|
|      | A | B | C | D | 1 | 2 | 3 | 4 |
| F1   | X |   |   |   |   | X |   |   |
| F2   | X |   |   |   |   |   | X |   |
| F3   | X |   |   |   | X |   |   |   |
| F4   |   |   | X |   |   | X |   |   |
| F5   |   |   | X |   |   |   | X |   |
| F6   |   |   | X |   | X |   |   |   |
| F7   |   | X |   |   |   | X |   |   |
| F8   |   | X |   |   |   |   | X |   |
| F9   |   | X |   |   | X |   |   |   |
| F10  |   |   |   | X |   | X |   |   |
| F11  |   |   |   | X |   |   | X |   |
| F12  |   |   |   | X | X |   |   |   |
| R1   | X |   |   |   |   |   |   | X |
| R2   |   |   | X |   |   |   |   | X |
| R3   |   | X |   |   |   |   |   | X |
| R4   |   |   |   | X |   |   |   | X |

Figure 4:
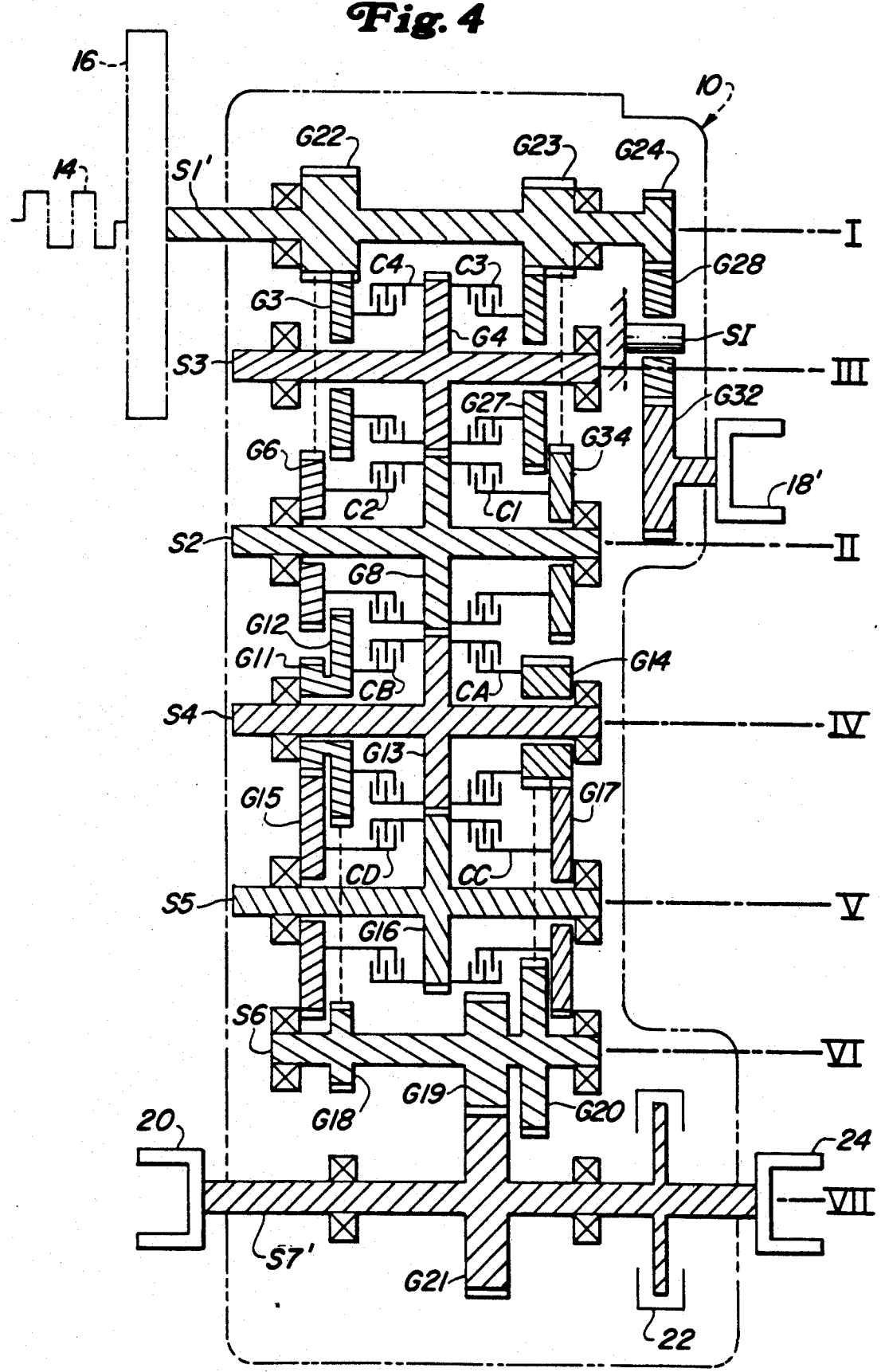
FIG. 4 is an 8 forward, 8 reverse speed configuration of the of FIG. 1.

The transmission just discussed in connection with FIGS. 1-3 can be easily modified to produce transmissions of varying configurations. FIG. 4 schematically illustrates an 8 forward, 8 reverse speed transmission. The shaft S1' and the gears associated therewith, along with some of the gears on shafts S2 and S3, are slightly different from those shown in FIG. 1. However, virtually all other elements of the transmission are identical to those shown in FIG. 1.

The differing elements are as follows: Shaft S1' is provided with three fixed gears G22, G23, G24. Rotatable gear G27 is substituted for rotatable gear G5 about shaft S3, and rotatable gears G34 is substituted for gear G9, G10 about shaft S2. Gears G27, G34 each mesh continuously with gear G23. An idler shaft with associated idler gear G28 is provided adjacent to the right end of shaft S1', with the gear G28 meshing continuously with gear G24. An output gear G32 is provided to provide PTO power to the PTO yoke 18', and meshes continuously with gear G28. Such a structure is optional, and would be provided merely to allow appropriate positioning of the PTO yoke 18. Similarly, output shaft S7' also can be provided at its front end with a front wheel drive yoke 24 to provide power to a suitable drive shaft (not shown) for a front wheel drive of the vehicle.

This 8 forward, 8 reverse speed transmission can be operated by engaging the various clutches as indicated in Table 8/8 to provide the various transmission ratios.

TABLE 8/8

| Gear | Clutch | | | | | | | |
|------|---|---|---|---|---|---|---|---|
|      | A | B | C | D | 1 | 2 | 3 | 4 |
| F1   | X |   |   |   | X |   |   |   |
| F2   | X |   |   |   |   | X |   |   |
| F3   |   |   | X |   | X |   |   |   |
| F4   |   |   | X |   |   | X |   |   |
| F5   |   | X |   |   | X |   |   |   |
| F6   |   | X |   |   |   | X |   |   |
| F7   |   |   |   | X | X |   |   |   |
| F8   |   |   |   | X |   | X |   |   |
| R1   | X |   |   |   |   |   | X |   |
| R2   | X |   |   |   |   |   |   | X |
| R3   |   |   | X |   |   |   | X |   |
| R4   |   |   | X |   |   |   |   | X |
| R5   |   | X |   |   |   |   | X |   |
| R6   |   | X |   |   |   |   |   | X |
| R7   |   |   |   | X |   |   | X |   |
| R8   |   |   |   | X |   |   |   | X |

Figure 5:
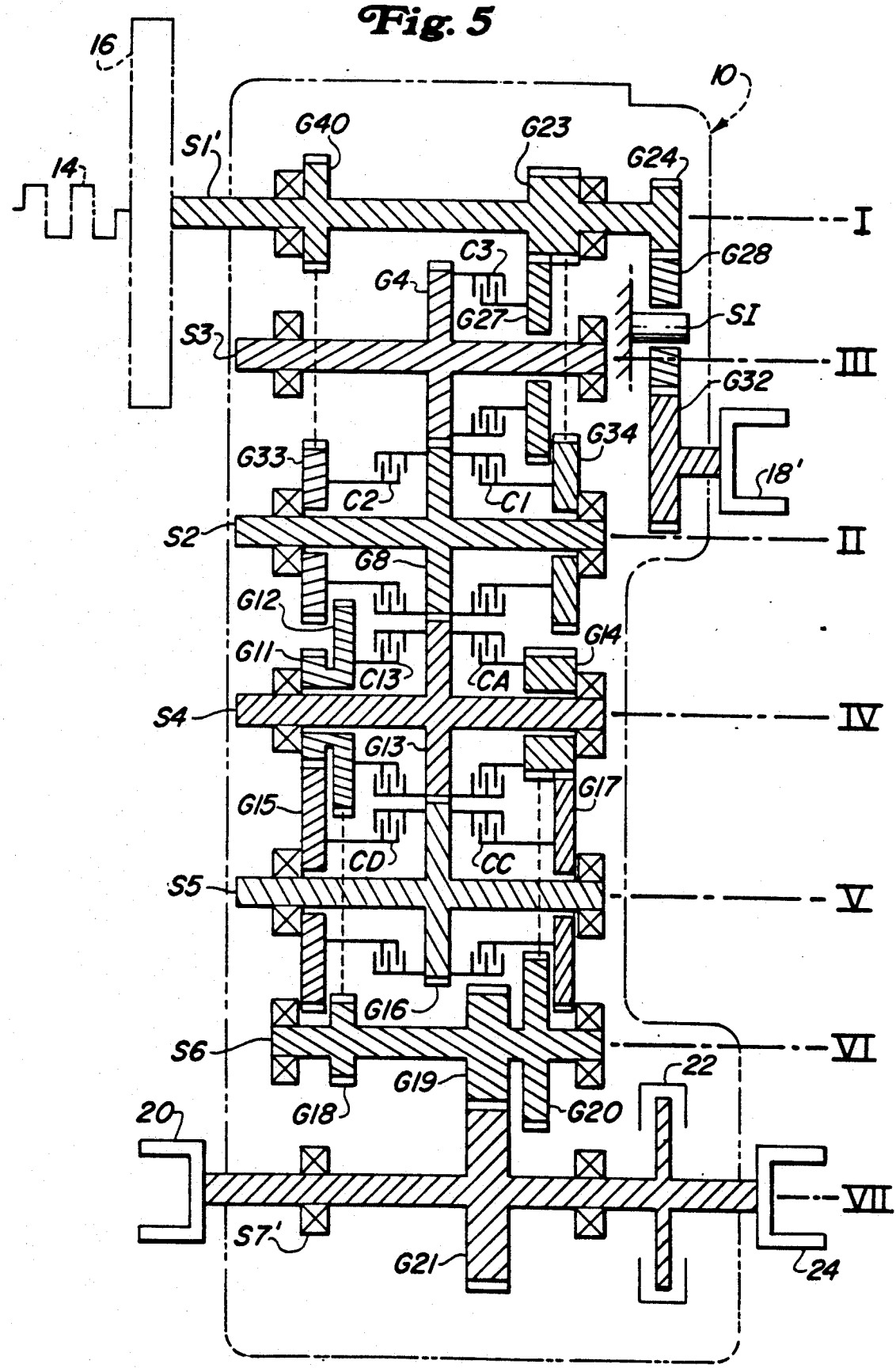
FIG. 5 is an 8 forward, 4 reverse speed configuration of the transmission shown in FIG. 1.

FIG. 5 schematically illustrates an 8 forward, 4 reverse speed transmission similar to the 8 forward, 8 reverse speed transmission in FIG. 5. FIG. 5 is substantantially identical to FIG. 4, except that clutch C4 and gear G3 have been omitted, and a smaller gear G40 has been substituted for large gear G22. Large gear G22 could be used, if preferred. The resulting omission eliminates four gear speeds in reverse, changing the transmission from an 8 forward, 8 reverse transmission to an 8 forward, 4 reverse transmission.

This 8 forward, 4 reverse speed transmission can be operated by engaging the various clutches as indicated in Table 8/4 to provide the various transmission ratios.

TABLE 8/4

| Gear | Clutch | | | | | | |
|------|---|---|---|---|---|---|---|
|      | A | B | C | D | 1 | 2 | 3 |
| F1   | X |   |   |   | X |   |   |
| F2   | X |   |   |   |   | X |   |
| F3   |   |   | X |   | X |   |   |
| F4   |   |   | X |   |   | X |   |
| F5   |   | X |   |   | X |   |   |
| F6   |   | X |   |   |   | X |   |
| F7   |   |   |   | X | X |   |   |
| F8   |   |   |   | X |   | X |   |
| R1   | X |   |   |   |   |   | X |
| R2   |   |   | X |   |   |   | X |
| R3   |   | X |   |   |   |   | X |
| R4   |   |   |   | X |   |   | X |

Figure 6:
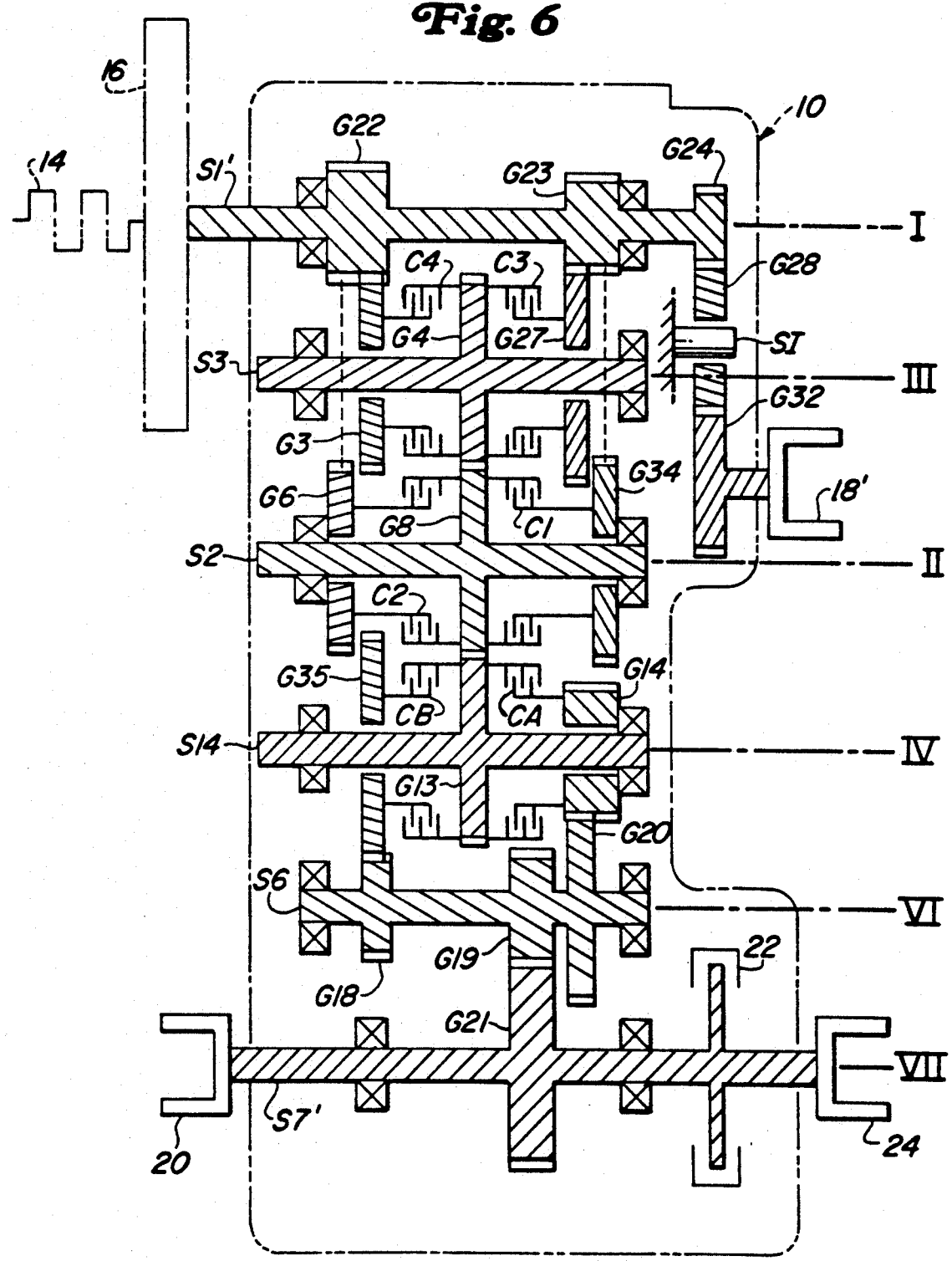
FIG. 6 is a 4 forward, 4 reverse speed configuration of the transmission shown in FIG. 1.

FIG. 6 schematically illustrates a 4 forward, 4 reverse speed transmission. This transmission is substantially identical to the 8 forward, 8 reverse speed transmission shown in FIG. 4, except that shaft S5 and its associated gears have been omitted entirely. A single gear G35 also preferably is substituted for the double gear G11, G12 on shaft S4, since the double gear provided a connection to a gear on shaft S5 which is not needed if shaft S5 is omitted. Since shaft S5 had a doubling effect on the other parts of the transmission, this reduces the total number of ratios from 8 forward, 8 reverse to 4 forward, 4 reverse.

This 4 forward, 4 reverse speed transmission can be operated by engaging the various clutches as indicated in Table 4/4 to provide the various transmission ratios.

TABLE 4/4

| Gear | Clutch | | | | | |
|------|---|---|---|---|---|---|
|      | A | B | 1 | 2 | 3 | 4 |
| F1   | X |   | X |   |   |   |
| F2   | X |   |   | X |   |   |
| F3   |   | X | X |   |   |   |
| F4   |   | X |   | X |   |   |
| R1   | X |   |   |   | X |   |
| R2   | X |   |   |   |   | X |
| R3   |   | X |   |   | X |   |
| R4   |   | X |   |   |   | X |

It will be noted that all of the configurations shown can be constructed with substantially the same components in the same housing. There is no need to change most of the transmission. This significantly reduces costs while allowing a wide variety of optional transmission configurations.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:
1. A transmission comprising:
   a. a housing;
   b. a first shaft rotatably mounted in said housing and having a plurality of gears fixed for rotation therewith;
   c. a second shaft rotatably mounted in said housing and having at least one gear fixed for rotation therewith, at least one gear rotatably mounted thereabout and at least one clutch for fixing said rotatable gear for rotation with said second shaft;
   d. a third shaft rotatably mounted in said housing and having at least one gear fixed for rotation therewith, at least one gear rotatably mounted thereabout and at least one clutch for fixing said rotatable gear for rotation with said third shaft, at least one of said gears on said third shaft meshing with said gears on said first shaft and at least one of said gears on said third shaft meshing with said gears on said second shaft, and said third shaft, its fixed gear and at least one clutch, being substantially identical to said second shaft and its fixed gear and at least one clutch;
   e. a fourth shaft rotatably mounted in said housing and having at least one gear fixed for rotation therewith, at least one gear rotatably mounted thereabout and at least one clutch for fixing said rotatable gear for rotation with said fourth shaft, at least one of said gears on said fourth shaft meshing with said gears on said second shaft, and said fourth shaft, its fixed gear and at least one clutch, being substantially identical to said second shaft and its fixed gear and at least one clutch;
   f. a fifth shaft rotatably mounted in said housing and having at least one gear fixed for rotation therewith, at least one gear rotatably mounted thereabout and at least one clutch for fixing said rotatable gear for rotation with said second shaft, at least some of said gears on said fifth shaft meshing with said gears on said fourth shaft, and said fifth shaft, its fixed gear and at least one clutch, being substantially identical to said second shaft and its fixed gear and at least one clutch;
   g. an intermediate shaft rotatably mounted in said housing and having a plurality of gears fixed for rotation therewith, at least some of said gears on said intermediate shaft meshing with said gears on said fourth shaft;
   h. an output shaft having a gear fixed for rotation therewith and meshing with a gear on said intermediate shaft.

2. The transmission of claim 1, wherein each of said second, third, fourth and fifth shafts is provided with two rotatable gears and two clutches for fixing said rotatable gears for rotation with the corresponding shaft, said shafts and clutches being substantially identical.

3. A transmission comprising:
   a. a housing;
   b. a first shaft rotatably mounted in said housing for receiving input power and having a first and a second gear fixed for rotation therewith;
   c. a second shaft rotatably mounted in said housing and having
      i. a third gear fixed for rotation therewith;
      ii. a double gear the surfaces of which serve as a fourth and a first gear rotatably mounted thereabout, said fourth gear meshing continuously with said first gear;
      iii. a first clutch for selectively fixing said fourth and fifth gears for rotation with said second shaft;
      iv. a sixth gear rotatably mounted thereabout, said sixth gear meshing continuously with said second gear; and
      v. a second clutch for selectively fixing said sixth gear for rotation with said second shaft;
   d. a third shaft rotatably mounted in said housing and having
      i. a seventh gear fixed for rotation therewith and meshing continuously with said third gear;
      ii. an eighth gear rotatably mounted thereabout, said eighth gear meshing continuously with said fifth gear;
      iii. a third clutch for selectively fixing said eighth gear for rotation with said third shaft;
      iv. a ninth gear rotatably mounted thereabout, said ninth gear meshing continuously with said second gear; and
      v. a fourth clutch for selectively fixing said ninth gear for rotation with said third shaft; said third shaft, seventh gear, third clutch and fourth clutch being substantially identical to said second shaft, third gear, first clutch and second clutch, respectively;

e. a fourth shaft rotatably mounted in said housing and having
  i. a tenth gear fixed for rotation therewith and meshing continuously with said seventh gear;
  ii. an eleventh gear rotatably mounted thereabout;
  iii. a fifth clutch for selectively fixing said eleventh gear for rotation with said fourth shaft;
  iv. a double gear the surfaces of which serve as a twelfth and a thirteenth gear rotatably mounted thereabout; and
  v. a sixth clutch for selectively fixing said twelfth and thirteenth gears for rotation with said fourth shaft; said fourth shaft, tenth gear, fifth clutch and sixth clutch being substantially identical to said second shaft, third gear, first clutch and second clutch, respectively;
f. a fifth shaft rotatably mounted in said housing and having
  i. a fourteenth gear fixed for rotation therewith and meshing continuously with said tenth gear;
  ii. a fifteenth gear rotatably mounted thereabout and meshing continuously with said eleventh gear;
  iii. a seventh clutch for selectively fixing said fifteenth gear for rotation with said fifth shaft;
  iv. a sixteenth gear rotatably mounted thereabout and meshing continuously with said thirteenth gear; and
  v. an eighth clutch for selectively fixing said sixteenth gear for rotation with said fifth shaft; said fifth shaft, fourteenth gear, seventh clutch and eighth clutch being substantially identical to said second shaft, third gear, first clutch and second clutch, respectively;
g. a sixth shaft rotatably mounted in said housing and having a seventeenth, an eighteenth and a nineteenth gear fixed for rotation therewith, said seventeenth and nineteenth gears meshing continuously with said eleventh and twelfth gears, respectively;
h. a seventh shaft rotatably mounted in said housing for providing output power and having a twentieth gear fixed for rotation therewith, said twentieth gear meshing continuously with said eighteenth gear.

4. The transmission of claim 3, further comprising parking brake means mounted to said seventh shaft for holding said transmission still.

5. A transmission comprising:
a. a housing;
b. a first shaft rotatably mounted in said housing for receiving input power and having a first and a second gear fixed for rotation therewith;
c. a second shaft rotatably mounted in said housing and having
  i. a third gear fixed for rotation therewith;
  ii. a fourth gear rotatably mounted thereabout, said fourth gear meshing continuously with said first gear;
  iii. a first clutch for selectively fixing said fourth gear for rotation with said second shaft;
  iv. a fifth gear rotatably mounted thereabout, said fifth gear meshing continuously with said second gear; and
  v. a second clutch for selectively fixing said fifth gear for rotation with said second shaft;
d. a third shaft rotatably mounted in said housing and having
  i. a sixth gear fixed for rotation therewith and meshing continuously with said third gear;
  ii. a seventh gear rotatably mounted thereabout, said seventh gear meshing continuously with said first gear; and
  iii a third clutch for selectively fixing said seventh gear for rotation with said third shaft; said third shaft, sixth gear, and third clutch being substantially identical to said second shaft, third gear and first clutch, respectively;
e. a fourth shaft rotatably mounted in said housing and having
  i. an eighth gear fixed for rotation therewith and meshing continuously with said third gear;
  ii. a ninth gear rotatably mounted thereabout;
  iii. a fourth clutch for selectively fixing said ninth gear for rotation with said fourth shaft;
  iv. a tenth gear rotatably mounted thereabout; and
  v. a fifth clutch for selectively fixing said tenth gear for rotation with said fourth shaft; said fourth shaft, eighth gear, fourth clutch and fifth clutch being substantially identical to said second shaft, third gear, first clutch and second clutch, respectively;
f. an intermediate shaft rotatably mounted in said housing and having an eleventh, a twelfth gear and a thirteenth fixed for rotation therewith, said eleventh and thirteenth gears meshing continuously with said ninth and tenth gears, respectively;
g. an output shaft rotatably mounted in said housing for providing output power and having a fourteenth gear fixed for rotation therewith, said fourteenth gear meshing continuously with said twelfth gear.

6. The transmission of claim 5, further comprising:
a. a double gear the surfaces of which serve as said tenth gear and as a fifteenth gear rotatably mounted about said fourth shaft, said fifth clutch fixing said tenth and fifteenth gears for rotation with said fourth shaft; and
b. a fifth shaft rotatably mounted in said housing and having
  i. a sixteenth gear fixed for rotation therewith and meshing continuously with said eighth gear;
  ii. a seventeenth gear rotatably mounted thereabout and meshing continuously with said ninth gear;
  iii. a sixth clutch for selectively fixing said seventeenth gear for rotation with said fifth shaft;
  iv. an eighteenth gear rotatably mounted thereabout and meshing continuously with said fifteenth gear; and
  v. a seventh clutch for selectively fixing said eighteenth gear for rotation with said fifth shaft; said fifth shaft, sixteenth gear, sixth clutch and seventh clutch being substantially identical to said second shaft, third gear, first clutch and second clutch, respectively.

7. The transmission of claim 6, further comprising:
a. a nineteenth gear rotatably mounted about said second shaft and meshing continuously with said second gear; and
b. an eighth clutch about said second shaft for fixing said nineteenth gear for rotation with said second shaft.

8. The transmission of claim 5, further comprising:
a. a fifteenth gear rotatably mounted about said second shaft and meshing continuously with said second gear; and b. an eighth clutch about said second shaft for fixing said fifteenth gear for rotation with said second shaft.

9. The transmission of claim 5, further comprising:
a. an additional gear fixed for rotation with said first shaft;
b. an idler shaft mounted in said housing and having an idler gear rotatably mounted thereabout, said idler gear meshing continuously with said additional gear; and
c. a PTO shaft rotatably mounted in said housing for providing power take-off and having a PTO gear fixed for rotation therewith, said PTO gear meshing continuously with said idler gear.

10. The transmission of claim 5, further comprising a front wheel drive yoke mounted at one end of said output shaft and a rear wheel drive yoke mounted at another end of said output shaft.

* * * * *